UNITED STATES PATENT OFFICE.

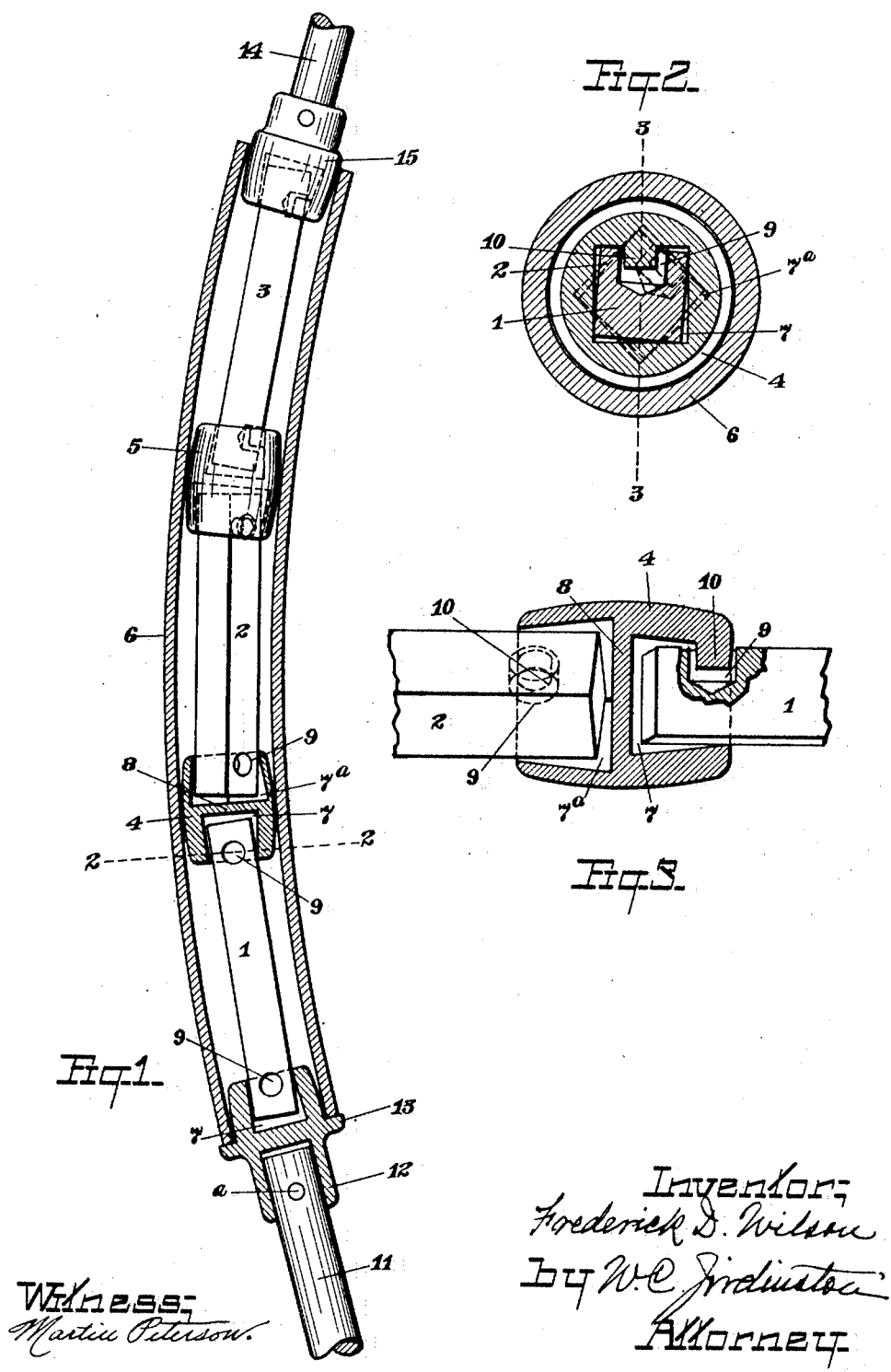

FREDERICK D. WILSON, OF MOLINE, ILLINOIS, ASSIGNOR TO DEERE AND COMPANY, OF MOLINE, ILLINOIS, A CORPORATION OF ILLINOIS.

FLEXIBLE SHAFT.

1,315,806.      Specification of Letters Patent.      Patented Sept. 9, 1919.

Application filed November 8, 1915. Serial No. 60,380.

*To all whom it may concern:*

Be it known that I, FREDERICK D. WILSON, a citizen of the United States, residing at Moline, in the county of Rock Island and State of Illinois, have invented certain new and useful Improvements in Flexible Shafts, of which the following is a specification, reference being had therein to the accompanying drawing.

My invention relates to flexible shafts employed to transmit power from a fixed rotating shaft or body to a similar shaft located on a movable structure, and it consists of a series of short shafts joined together in a manner fully hereinafter explained and adapted to rotate in a tubular casing bent as may be necessary.

The object of my invention is to simplify the construction of such a shaft by diminishing the number of parts and reducing the cost of manufacturing without impairing its efficiency.

Referring to the drawings in which similar numerals indicate identical parts—

Figure 1 is a longitudinal section of the casing showing the shaft in part section.

Fig. 2 is a section on the line 2—2 of Fig. 1, and

Fig. 3 is a section on the line 3—3 of Fig. 2.

My device comprises a series of links 1, 2 and 3 joined together by couplings 4 and 5 and operating within a casing 6. Each of the couplings 4 and 5 has rectangular sockets 7 and 7ª in which the ends of the links are held; the sockets 7 and 7ª are separated by a web 8 central of the coupling and preferably integral therewith. The links are preferably rectangular in cross section to provide driving faces and fit loosely within the sockets 7 and 7ª. In one side of the links, and adjacent the ends thereof, are recesses 9 which are adapted to engage with studs 10 in the sockets 7 and 7ª, the studs 10 being preferably integral with the couplings and smaller than the recesses 9 in order that the walls of the sockets will take the torsional strain developed by turning the shaft, and the danger of breaking the studs 10 by such torsional strain is eliminated.

A driving shaft 11 is rigidly secured in a socket in an end of a coupling 12 by a pin *a* and is provided with a flange 13 which is adapted to fit against an end of the casing 6; the opposite end of the coupling 12 is connected to the link 1 in a manner similar to the connection of the links with the couplings 4 and 5. The driven shaft 14 is connected to the flexible shaft by a coupling 15 similar to the coupling 12, but without the flange, so that the flexible shaft can be withdrawn from the casing 6 after disconnecting the driven shaft 14 and the coupling 15.

Preferably the couplings are made of malleable iron and are cylindrical in shape before the flexible shaft is assembled. In assembling the shaft the ends of the links are introduced into the sockets 7 and 7ª so that the studs 10 can be engaged with the recesses 9, the ends of the couplings are then subjected to lateral pressure until the edges of the sockets are sufficiently pressed inwardly to hold the studs 10 in place in the recesses 9. The sides of the sockets 7 are at angles of 45 degrees with the sides of the sockets 7ª and the stud 10 in the socket 7 is at a similar angle with the stud 10 in the socket 7ª. By such construction the links are practically given an eighth turn as the shaft is assembled, the studs 10 being practically equidistant from each other in a circular direction; by this arrangement greater flexibility is given the shaft with less wear to the parts. It does not follow however that I limit myself to this arrangement for the angular relation described may be varied without affecting the scope of my invention.

As the ends of the links are smaller than the sockets 7 and 7ª the links move freely when the shaft is turned, and as the studs 10 are smaller than the recesses 9 the shaft has also a longitudinal flexibility, adding materially to its flexible qualities and its efficiency and durability. As shown and described I have produced a flexible shaft with a minimum number of parts which can be manufactured economically, and quickly assembled.

What I claim is—

1. A flexible shaft comprising a series of rectangular links having recesses adjacent the ends thereof, and couplings connecting said links and having rectanguar sockets in which the ends of the links are loosely held, said sockets having means extending from the walls thereof to engage with the recesses in the links to prevent withdrawal of the latter.

2. A driving shaft comprising a series of links having exterior faces and provided with recesses adjacent the ends thereof, and couplings having interiorly faced sockets in which the ends of the links are loosely held, said sockets having means to loosely engage with the recesses in the links to permit a longitudinal movement of the latter and to prevent a withdrawal thereof.

3. A flexible shaft comprising a series of faced links, each link having a recess at each end and in the side thereof, and couplings having sockets adapted to receive the ends of the links and in which the links are loosely held, said couplings having means integral with a wall of said sockets to engage with the recesses in the links to prevent the withdrawal of the latter.

4. A flexible shaft comprising a series of faced links, each link having a recess at each end and in the side thereof, and couplings having sockets adapted to receive the ends of the links and in which the links are loosely held, said sockets having studs in a wall thereof and adapted to engage with the recesses in the links to prevent the withdrawal of the latter.

5. A flexible shaft comprising a series of links rectangular in cross section, each link having recesses in one side and adjacent the ends thereof, and couplings having rectangular sockets in which the ends of the links are loosely held, said sockets having studs to engage with the recesses in the links to prevent withdrawal of the latter.

6. A flexible driving shaft comprising a series of links having exterior driving faces near the ends thereof and provided with recesses, and couplings having sockets with interior faces to coöperate with the exterior faces of the links and in which the ends of the links are loosely held, the couplings having means to engage with the recesses in the links to prevent withdrawal of the latter from the sockets.

In testimony whereof I affix my signature, in presence of two witnesses.

FREDERICK D. WILSON.

Witnesses:
JESSIE SIMSER,
W. G. DUFFIELD.

Copies of this patent may be obtained for five cents each, by addressing the "Commissioner of Patents, Washington, D. C."